(12) United States Patent
Richards

(10) Patent No.: US 11,208,121 B2
(45) Date of Patent: Dec. 28, 2021

(54) RAILCAR SYSTEM

(71) Applicant: CROSSROADS RAILCAR SERVICES, INC., Stearns, KY (US)

(72) Inventor: Steve Richards, Stearns, KY (US)

(73) Assignee: Crossroads Railcar Services, Inc, Stearns, KY (US)

(*) Notice: Subject to any disclaimer, the term of this patent is extended or adjusted under 35 U.S.C. 154(b) by 257 days.

(21) Appl. No.: 16/664,921

(22) Filed: Oct. 27, 2019

(65) Prior Publication Data

US 2021/0122399 A1  Apr. 29, 2021

(51) Int. Cl.
| | |
|---|---|
| *B61D 17/06* | (2006.01) |
| *B61D 17/04* | (2006.01) |
| *B61F 1/08* | (2006.01) |
| *B61D 17/10* | (2006.01) |

(52) U.S. Cl.
CPC .......... *B61D 17/06* (2013.01); *B61D 17/043* (2013.01); *B61D 17/10* (2013.01); *B61F 1/08* (2013.01)

(58) Field of Classification Search
CPC ........ B61D 17/043; B61D 17/10; B61D 1/00; B61D 17/00; B61D 17/04; B61D 17/06; B61D 17/12; B61D 17/22; B61D 49/00; B61D 17/18; B61D 17/041; B61F 1/10; B61F 1/12; B61F 1/14; B61F 5/14; B61F 19/04; B23P 15/00
USPC ........................................ 228/165–169, 174
See application file for complete search history.

(56) References Cited

U.S. PATENT DOCUMENTS

| | | | | |
|---|---|---|---|---|
| 435,676 | A | * | 9/1890 | Bissell .................. B61D 17/20 105/23 |
| 467,009 | A | * | 1/1892 | King ....................... B61F 5/38 105/165 |
| 1,095,761 | A | * | 5/1914 | Whitmore ............ B61D 17/22 105/20 |
| 2,124,264 | A | * | 7/1938 | Simonson ............ B61D 17/20 105/17 |
| 2,504,658 | A | * | 4/1950 | Theriault ............ B61D 17/043 105/397 |
| 2,815,723 | A | * | 12/1957 | Dean ..................... B61D 17/10 105/422 |
| 3,399,632 | A | * | 9/1968 | Dean ..................... B61D 17/20 105/15 |
| 3,754,515 | A | * | 8/1973 | Van Der Sluys ...... B61D 17/20 105/21 |

(Continued)

FOREIGN PATENT DOCUMENTS

JP            55030306 A  *  3/1980

*Primary Examiner* — Zachary L Kuhfuss
*Assistant Examiner* — Cheng Lin
(74) *Attorney, Agent, or Firm* — Chris Tanner; FYPA PLLC

(57) ABSTRACT

A modern scenic passenger railcar system is disclosed. The railcar system incorporates design and safety features of modern freightcars and modern passenger scenic railway cars. The railcar system incorporates a center beam with a square cross section as well as specialized crash posts with its frame. This results in enhanced safety and crashworthiness. The railcar system also incorporates cross members for absorbing and distributing shock and mechanical stress on the railcar system during use, by withstanding torsion and shear forces on the frame. This results in improved mechanical integrity of the frame and the railcar system overall.

16 Claims, 16 Drawing Sheets

(56) References Cited

U.S. PATENT DOCUMENTS

| | | | | |
|---|---|---|---|---|
| 3,800,118 | A * | 3/1974 | Wefers | B23K 11/163 |
| | | | | 219/91.21 |
| 4,315,375 | A * | 2/1982 | Shinn | E02F 3/401 |
| | | | | 172/719 |
| 5,267,515 | A * | 12/1993 | Tsuruda | B61D 17/041 |
| | | | | 105/397 |
| 6,866,452 | B2 * | 3/2005 | Khattab | B61D 45/007 |
| | | | | 410/69 |
| 7,543,367 | B2 * | 6/2009 | Beers | B61D 17/043 |
| | | | | 105/404 |
| 8,534,202 | B2 * | 9/2013 | McKisic | B61F 15/20 |
| | | | | 105/199.3 |
| 9,789,885 | B2 * | 10/2017 | Stiles | B61D 3/18 |
| 2006/0065152 | A1 * | 3/2006 | Heitmeyer | B62D 33/048 |
| | | | | 105/404 |
| 2019/0168782 | A1 * | 6/2019 | Yu | B61F 1/12 |
| 2020/0016695 | A1 * | 1/2020 | Pinarello | E21B 17/00 |

* cited by examiner

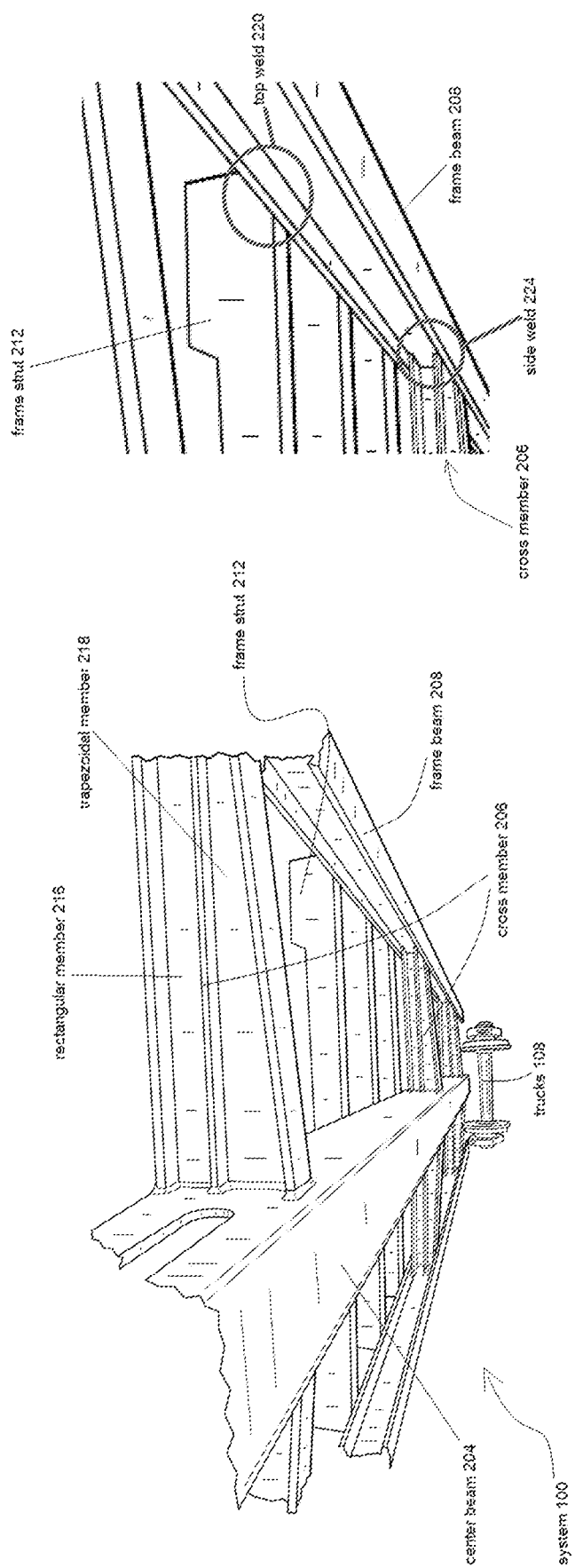

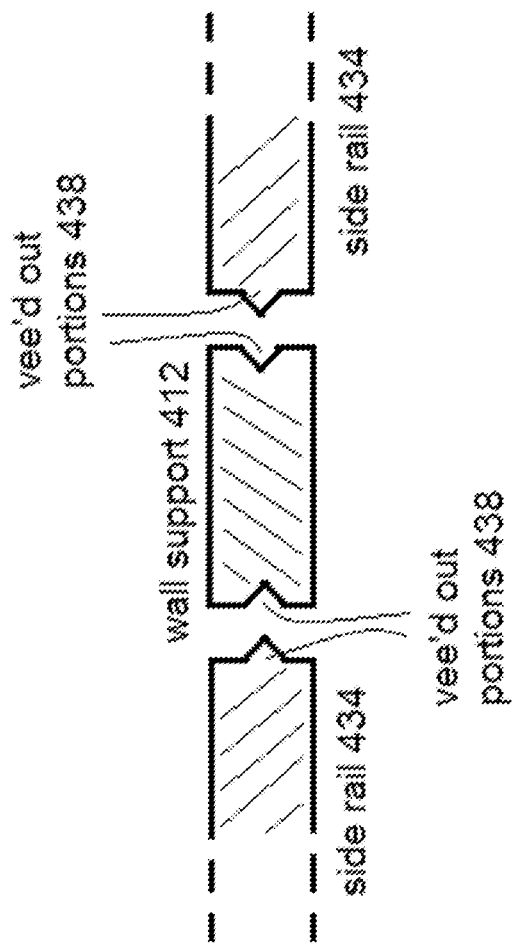
FIG. 5 (cross-sectional view of portion 412 and side rail 434 as seen from above)

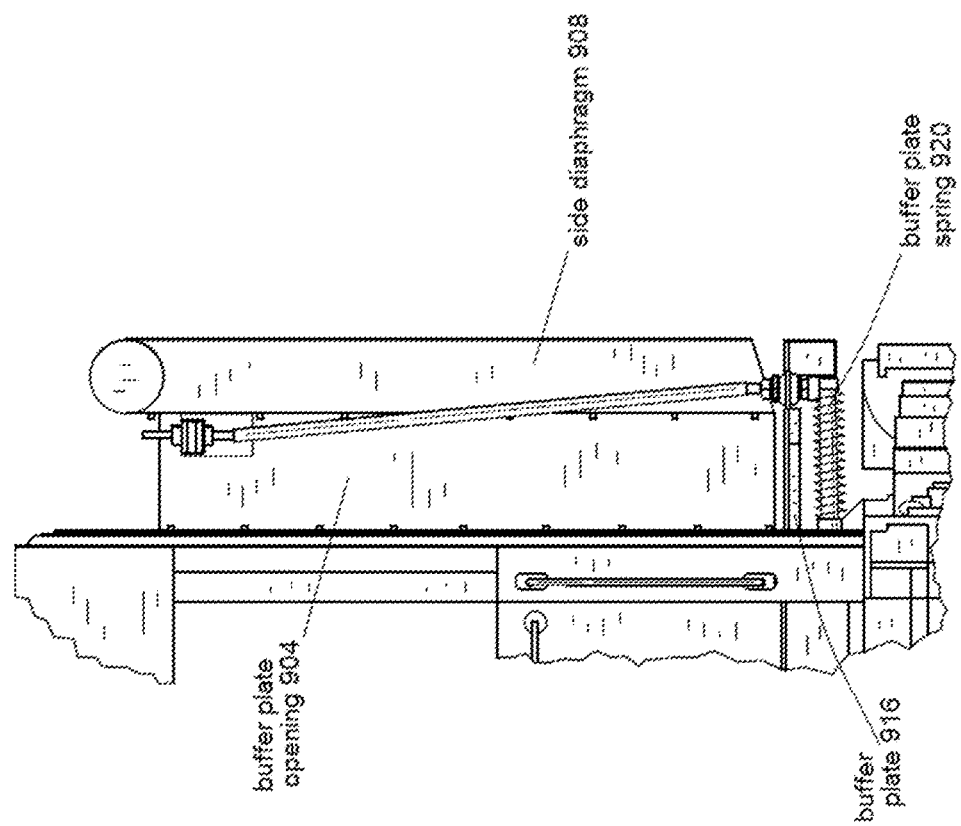

RAILCAR SYSTEM

BACKGROUND OF INVENTION

One hundred years ago railcars were being constructed of both wood and steel. Some had steel frames and wooden car bodies; some were steel frames with steel bodies. The power was generated from the wheels that turned a generator which in turn charged a bank of batteries. Some railcars were still using fuel oil interior lighting. During this era, safety was not a priority in the building of the railcars.

As railroads have closed over the years, museums and private railroad owners have purchased the railroad properties for operating tourist (scenic) railroads. They have used the existing equipment for transporting tourist (scenic) passengers.

Freight cars are designed for hauling cargo, not humans, and thus have a heavier spring configuration. Freight cars can also ride very rough. Freight cars were never designed to haul passengers. Conversely, a passenger railcar is designed to haul passengers in comfort and safety. The embodiments herein build new passenger railcars from scratch.

SUMMARY OF THE INVENTION

The modern scenic passenger railcar described herein is a hybrid railcar which incorporates both the design and safety features of modern freightcars and modern passenger scenic railway cars. This railcar is not only capable of passing all modern safety tests for freight railcars but also incorporates design features that make it a unique and outstanding passenger car for scenic railways. This scenic railway car is unique in its ability to be transported and operated using modern freight railways due to meeting or exceeding the safety specifications for both freight and passenger railcars.

DETAILED DESCRIPTION OF THE DRAWINGS

FIG. 1 shows a skeletal, non-complete, simplified view of an example railcar system;

FIGS. 2A, 2B, and 2C show underside views of the railcar system of FIG. 1;

FIG. 5 shows "vee'd out" types of welds;

Figure 9B:
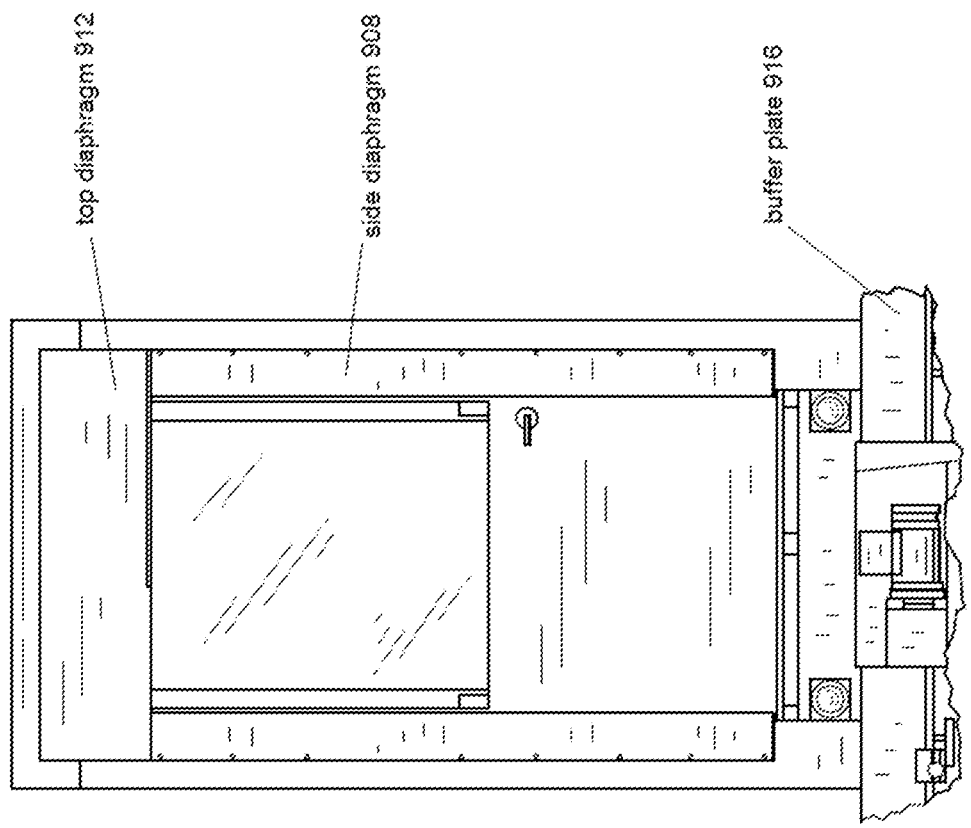

FIGS. 8A, 8B, 8C, and 8D show an example arrangement of a draft gear;

FIGS. 9A and 9B show detail of buffer (gang) plates and diaphragms; and

Figure 10:
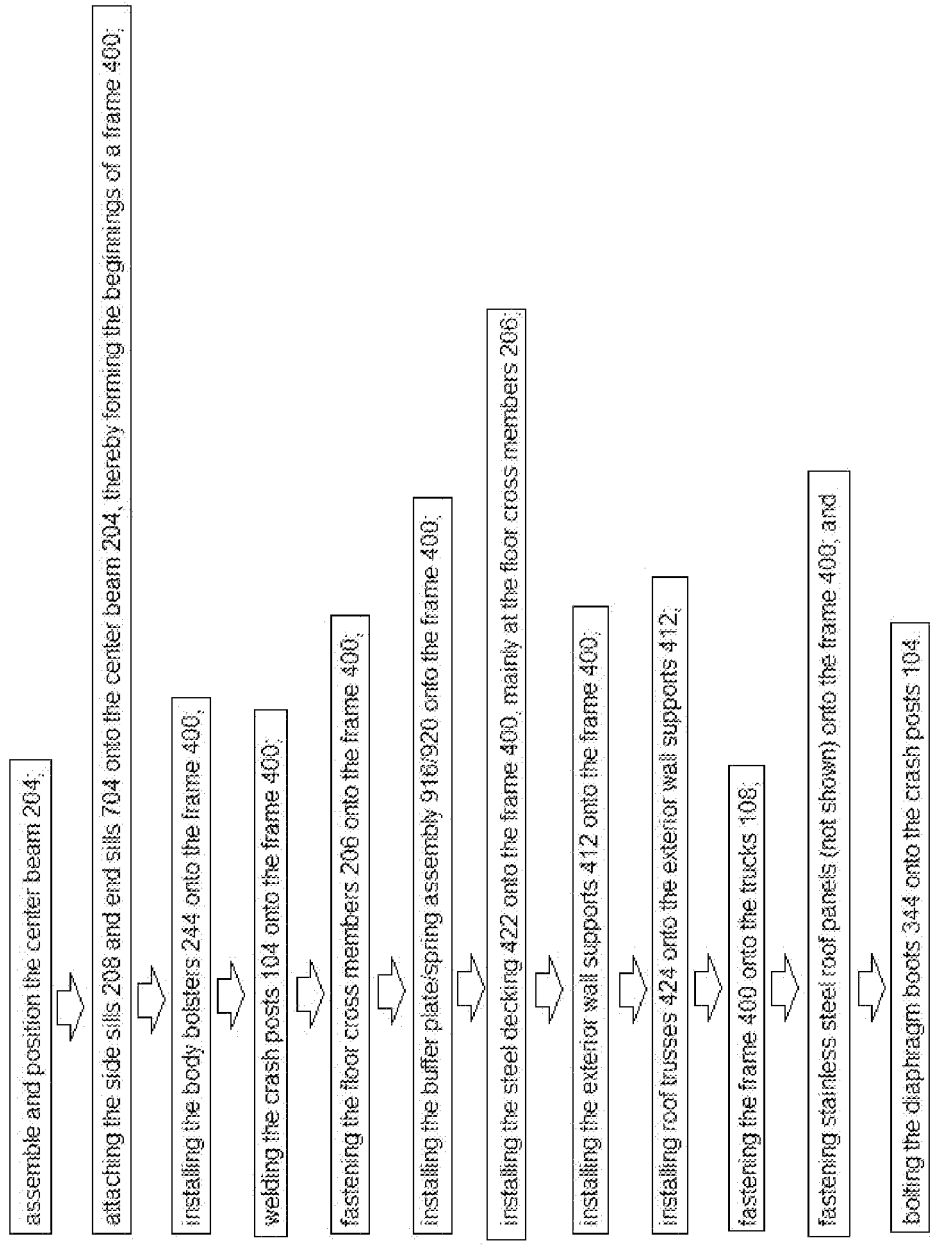

FIG. 10 shows an example flowchart of an example method of manufacture.

DETAILED DESCRIPTION OF THE EMBODIMENTS

In the following description, for the purposes of explanation, numerous specific details are set forth in order to provide a thorough understanding of the present invention. It will be apparent, however, that the present invention may be practiced without these specific details.

The railcar system 100 is made specifically for the tourist and scenic railroad industry. However, it is possible to also arrange for a frame such as that shown herein with a different body and use that for non-passenger freight.

An embodiment of the railcar system 100 described herein is capable of hauling seventy-two passengers, although other sizes are also contemplated. The railcar system 100 described herein is entirely built from scratch. The embodiments herein are all FRA (Federal Railway Association) safety compliant.

Figure 1:
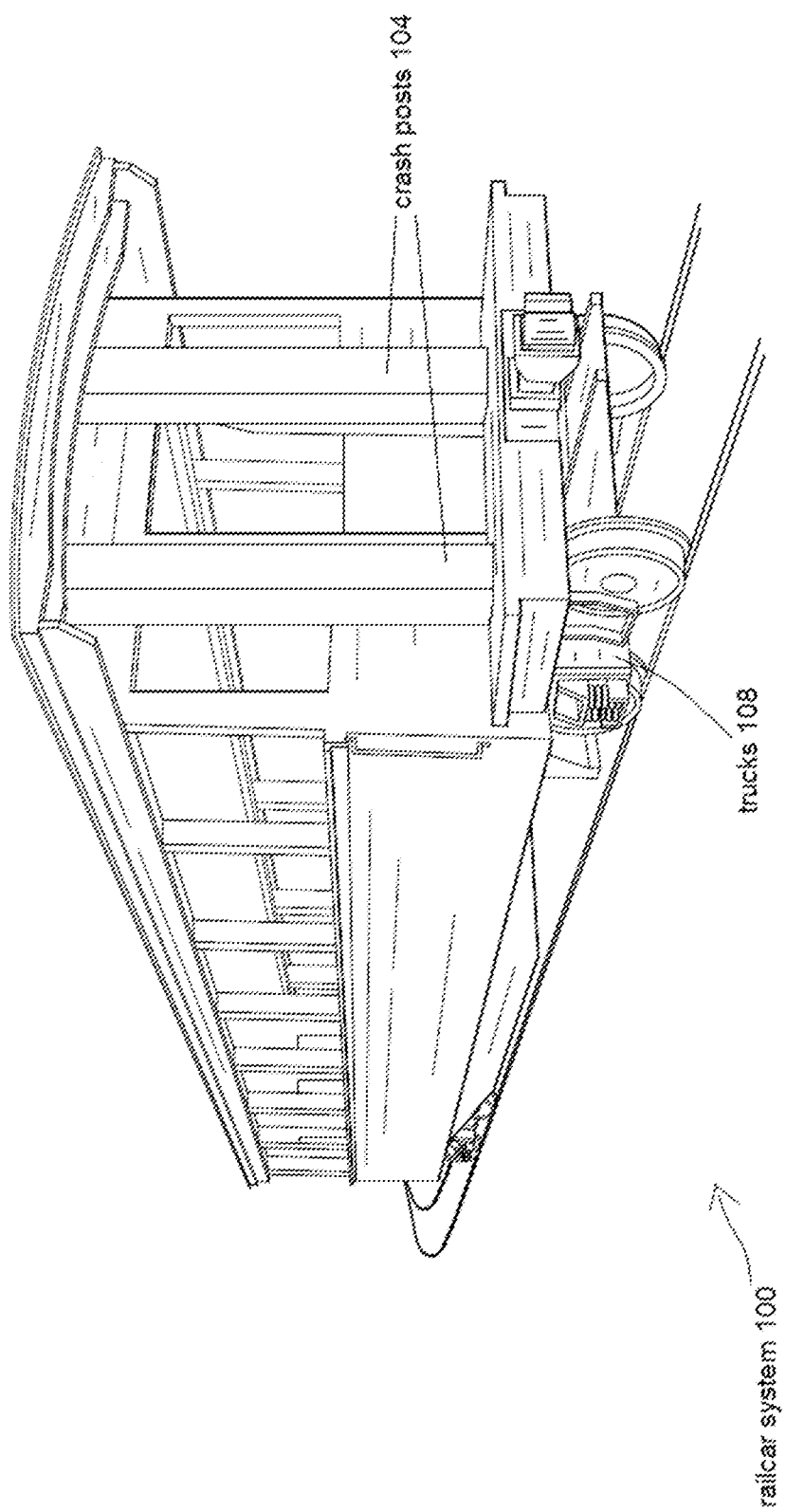

FIG. 1 shows a skeletal, non-complete, simplified view of an example railcar system 100, with numerous details omitted. For example, a center beam 204 is an important part of the system 100, but is not visible in FIG. 1. Numerous other Figures e.g. FIG. 2A will show the center beam 204. FIG. 1 is intended merely to provide a framework for understanding the embodiments herein, and thus should not be considered as limiting. From FIG. 1 it is apparent that the system 100 comprises crash posts 104 which are not found on freight cars, but are an important part of the railcar system 100. As shown in FIG. 1, the railcar system 100 also has trucks 108.

FIG. 2A shows an underside view of the system 100. From FIG. 2A it is apparent that the system 100 comprises a center beam 204, typically formed to have a square cross-section, and at least two side sills 208. The center beam 204 is included in order to gain the structural strength required to allow the embodiments herein to meet or exceed the necessary specifications for passenger use. The side sills 208 typically are positioned in parallel to and at either side to the center beam 204. The center beam 204 is connected to the side sills 208 by a cross members 206. In an embodiment, the cross members 206 comprise a rectangular member 216 and a trapezoidal member 218, although various types of cross members 206 can vary within the same frame 400, for example, sometimes being only rectangular, and/or sometimes being only trapezoidal. The purpose of the cross members 206 is to absorb and distribute shock and mechanical stress of the railcar 100 during use, by withstanding torsion and shear forces on the frame 400 thereby maintaining mechanical integrity. Additionally, a frame strut 212 provides support for the floor of a passenger compartment (not shown in FIG. 2A) of the railcar system 100. The frame strut 212 is welded to the center beam 204.

FIG. 2B shows the type and position of welds for connecting the center strut 206 and the frame strut 212 to a side sill 208. Specifically, the center strut 206 is welded to the side sill 208 using a side weld 224, while the frame strut 212 is welded to the side sill 208 using a top weld 220.

Figure 2C:
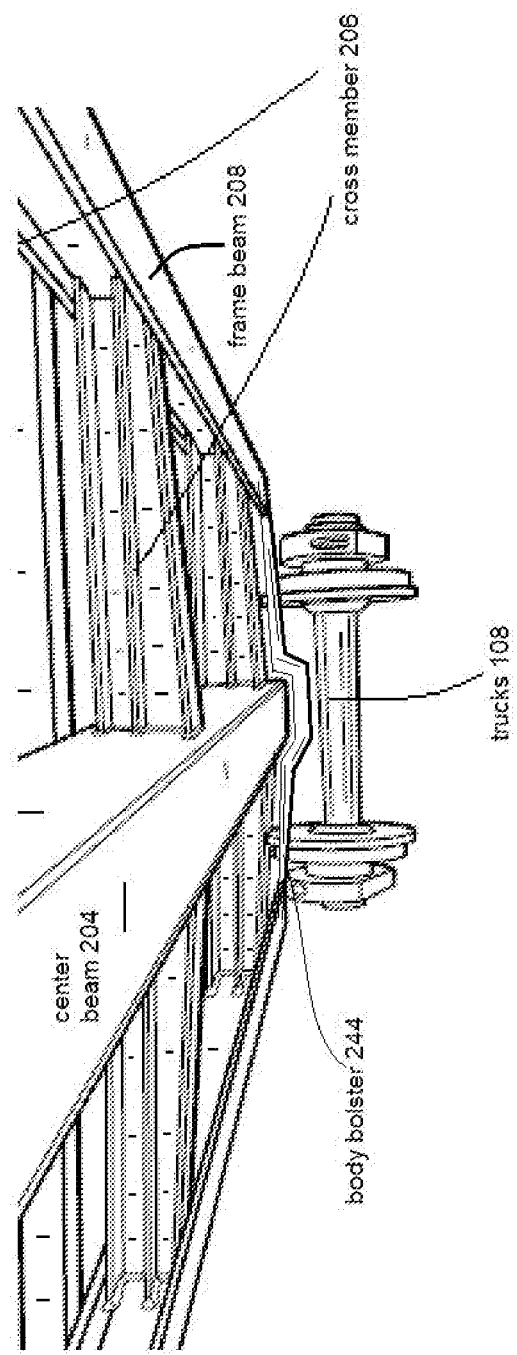

FIG. 2C shows a body bolster 244, located between the center beam 204, the frame beams 208, and the trucks 108. The body bolster 244 is customized to fit the specific dimensions of the center beam 204, the frame beams 208, among various other portions of the underside of the frame 400 (see FIG. 4A). One purpose of the body bolsters 244 is to properly connect the trucks 108 to the frame 400.

Figure 3A:
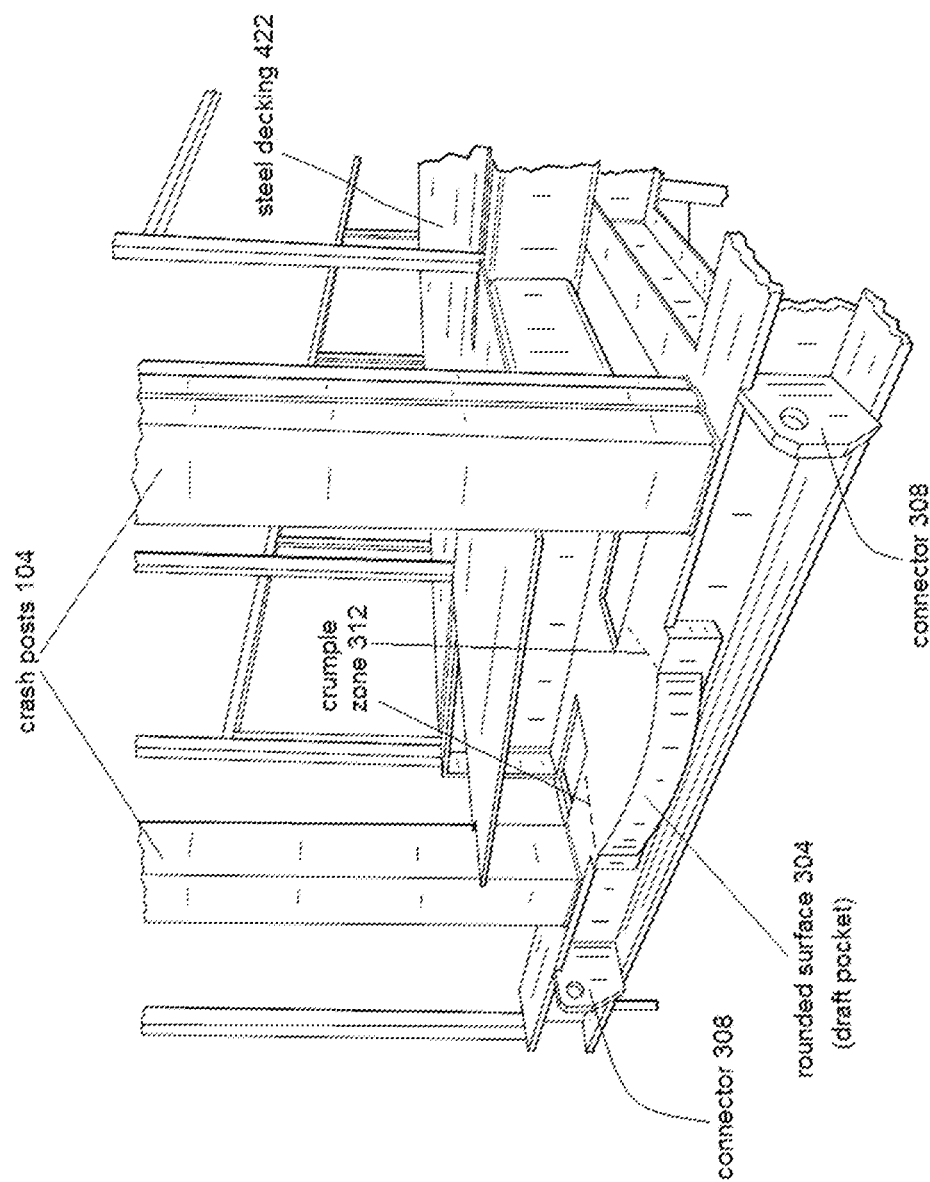
FIG. 3A shows an incomplete, skeletal end-view of an embodiment of the railcar system.

FIG. 3A shows an incomplete, skeletal end-view of an embodiment of the railcar system 100, in which the crash posts 104 are apparent, and also comprising a curved surface (draft pocket) 304. In an embodiment, the curved surface (draft pocket) 304 can be altered to make an adaptable hitch system (not shown) to connect to e.g. a trolley arrangement. One example might be at public events where an event coordinator has a large tourist overflow. If so, that event coordinator can hook the railcar system 100 using one of these adaptable hitch systems and then pull it as an overflow vessel, connected to e.g. the trolley. It is thus possible for an embodiment of the railcar system 100 being attached to the bar car with tables, chairs and outdoor lighting, music. This would be like sitting on a patio, but a gently moving patio.

The embodiments herein also include multiple ways to potentially adapt the curved surface (draft pocket) 304 shown in FIG. 3A. One possible variation might be to install a trolley draft (not shown) thereupon. Some trolleys just have a simple connection mechanism like a farm tractor-implement style. Having the curved surface (draft pocket) 304 available keeps the railcar system 100 adaptable to lots of different purposes.

FIG. 3A also shows connectors 308, which are mainly for picking up the railcar body with a crane. However, during operation, it is also possible to connect safety chains to the connectors 308, thereby assisting in chaining groups of railcar systems 100 together. Having the chain connectors 308 lower can increase safety and decrease a chance of the safety chains not working during travel e.g. a steep grade.

Also as shown in FIG. 3A, the railcar system 100 further comprises a crumple zone 312, for providing some crumpling and distorting, but preventing breakage. Another way to describe the crumple zone 312 is a "shear point", which during an impact would crumple or shear in a known, safe direction.

Figure 3B:
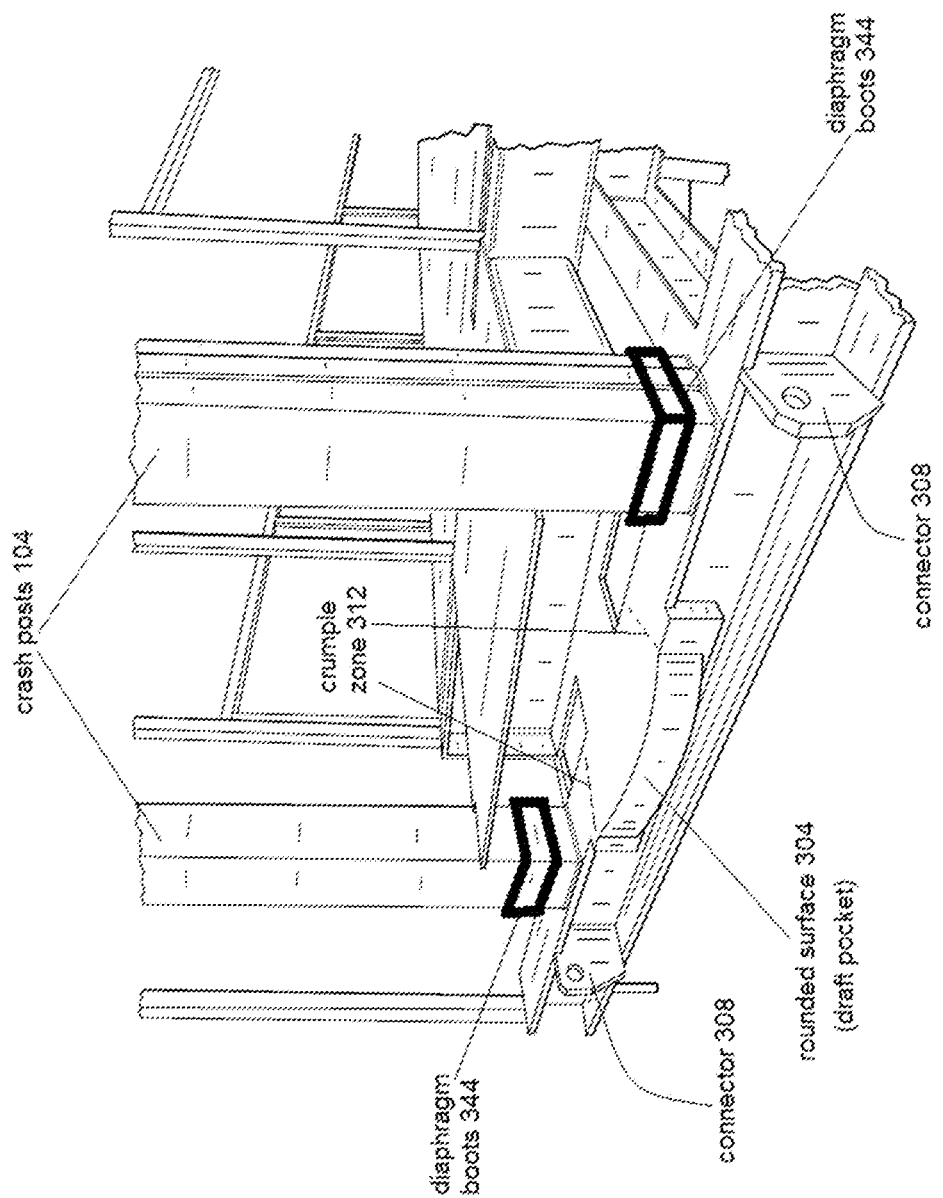
FIG. 3B show diaphragm boots within the embodiment of FIG. 3A.

FIG. 3B show diaphragm boots 344 attached to the crash posts 104. In an embodiment, the diaphragm boots 344 resemble a rubber gasket, and can be bolted onto the crash posts 104.

Design of Frame 400

Figure 4A:
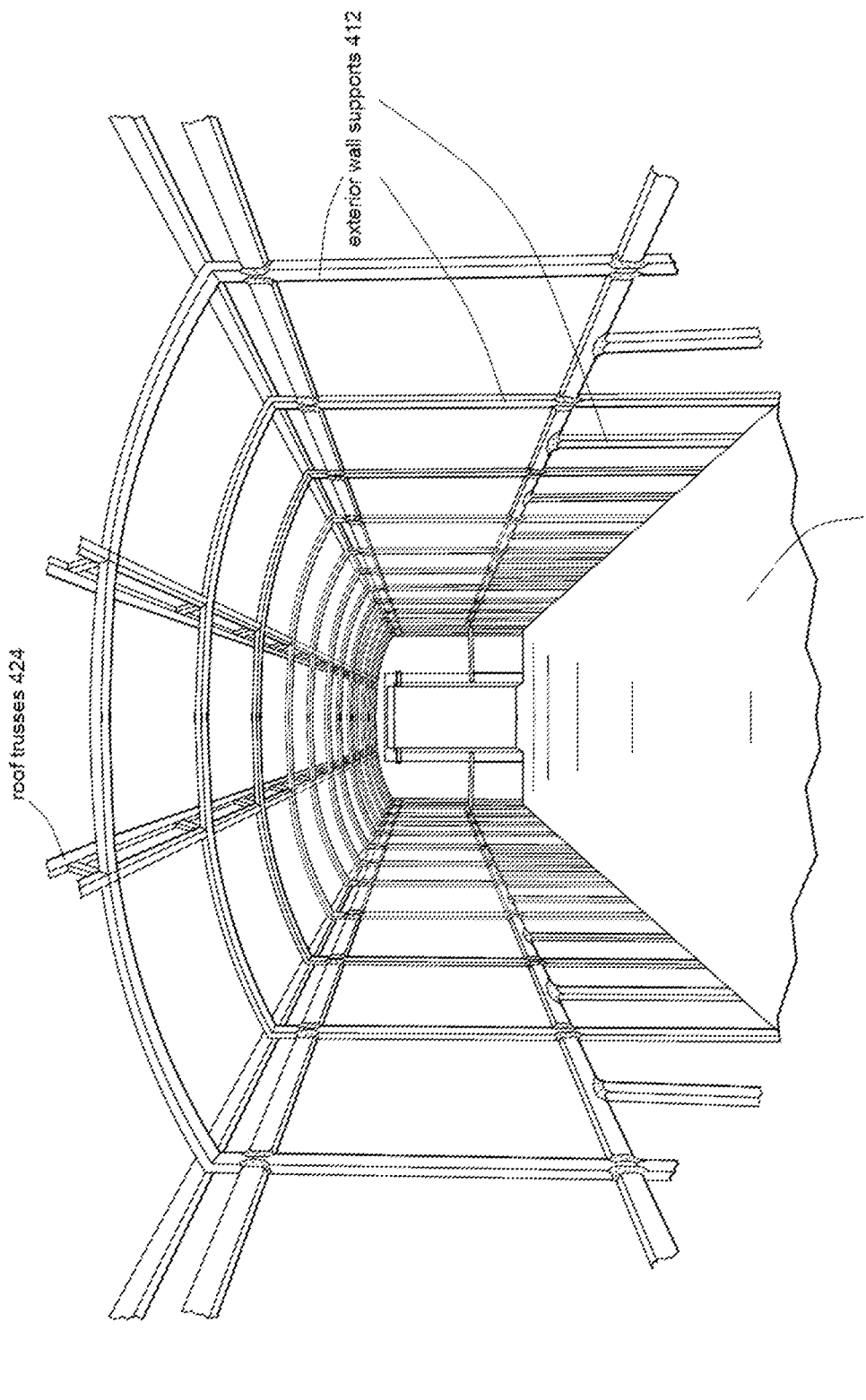
FIGS. 4A-4B show detail about the frame.
Figure 4B:
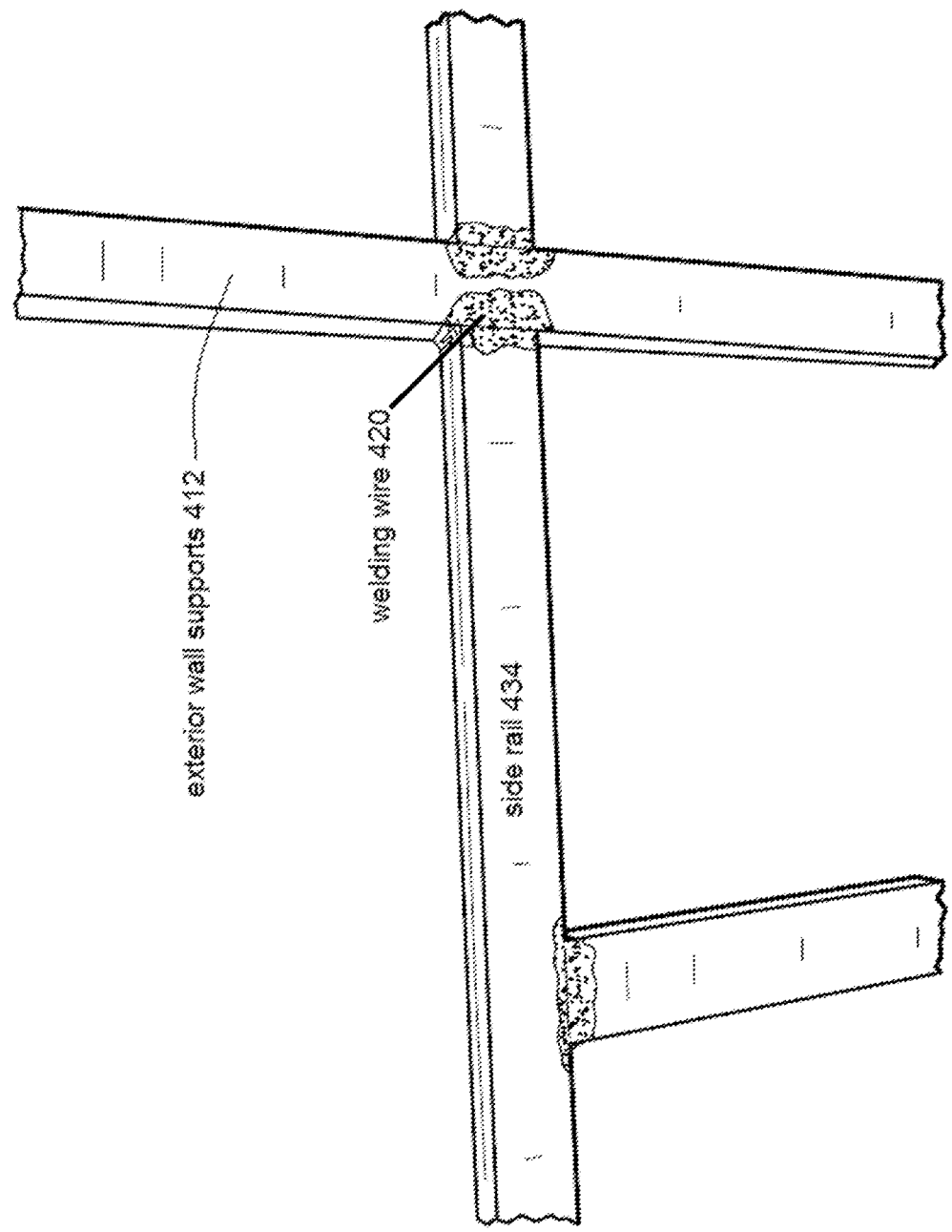

FIGS. 4A-4B show detail about the frame 400. Within this disclosure, the expression "welding wire" will be assumed to apply to wire that is used in a welding process, a welding term of art, not wire that acts as an electrical conductor. There are different grades of wire for welding, where the welding wire 420 can be rated or graded by tensile strength. The wire used within the system 100 is 70,000 PSI tensile strength. The wire acts as a type of filler metal.

FIGS. 4A-4B show a portion 412 of the frame 400 as being rectangular in shape, and show the welding wire 420 in-use and visible (at room temperature) as part of a completed weld connecting the side rail 434 to exterior wall support 412. Remember that FIGS. 4A-4B do not show a finished version, but instead are intended mainly to illustrate selected portions of the frame 400, in a type of skeletal context. The exterior wall support 412 can be positioned to be either perpendicular to or parallel (flush) with a longitudinal center axis of the frame 400. FIGS. 4A and 4B show the portion 412 as being parallel (flush). However, one reason to turn the exterior wall support 412 by 90 degrees (non-flush) would be to achieve a greater width of sidewall so as to accommodate e.g. 3" of insulation within a body portion of the finished railcar system 100.

In an embodiment, roof panels are bent and formed to fit the frame 400, and in particular to fit the roof trusses 424. FIG. 4A shows steel decking 422, located above and welded to the cross beams 206 (not shown in FIG. 4A, but shown in FIGS. 2A and 2B).

FIG. 5 is a cut view of cross-sections in which an example side rail 434 and portion 412 have "vee'd out" sections 438, so that when the side rail 434 is welded to the portion 412, full penetration on the weld are achieved. The expression "vee'd" refers to grinding and actually make a V-shaped cut in one surface to be welded and a V-shaped protrusion in the other surface to be welded, so that when they go together, there exists a matching V shape in between the two surfaces. This technique makes it for a much stronger weld. When welding metal, the welding wire 420 goes in the vee'd gap, such that the welded joint becomes stronger than actual steel. In FIG. 5, the two surfaces to be vee'd out and then welded are the side rail 434 and the vertical portion 412. However, many of the welds within the frame 400 are vee'd out, it would be impossible to show each one.

Thus, a weld being "vee'd out" means that one can avoid a mere butt-joint weld, which is not as strong as a "vee'd out" weld. Being vee'd out means that the welding wire 420 has room to strengthen and improve the weld, and thus improve the resulting joint.

Moving onto safety of the frame 400, a possible "roll-over" occurrence and the crash posts 104 will now be discussed. The crash posts 104 are attached with strong durable welds, so as to withstand a rollover, and also have diaphragm boots 344 (FIG. 3B) installed. In a collision or accident, the crash posts 104 and other features will ensure that frame 400 may compress a bit, but it will not deform the overall structure. The result would be some distortion, but in general the frame 400 would hold its overall shape.

Additionally, within the frame 400, the square center beam 104 has a much stronger durability than a C channel or I channel that typically appears on conventional railcars. A single railcar may weigh one hundred thousand pounds, and during use another a hundred thousand pounds attached behind. If one railcar crashes, it comes to a sudden stop but everything behind will keep going, because of momentum. In such a case, the square center beam (channel) 104 is better and stronger than other channel-shapes during collisions.

The frame 400 further comprises constant contact side bearings (CCSB), which controls the vertical movement and leaning on the cars to give a much smoother ride. When the railcar system 100 goes into a curve, the CCSB controls how much the car will lean while going through the curve.

"Squeeze" Testing

It is an advantage of the embodiments herein to provide a more cost effective assembly while maintaining a level of strength and structural stability in this type of railcar to meet or exceed all of the compression and tensile tests for an over the rail modern freight car. These tests are sometimes referred to as "squeeze" tests.

Due to the various specialized welds described herein, the crash posts 104, and other of the features described herein, the railcar system 100 can withstand an impact load of 1,250,000 lbf (pound-force), and a compressive end load of 1,000,000 lbf (pound-force). A computer simulated squeeze test on the car failures or future failures applied a hypothetical 800,000 psi impact to the railcar system 100 and the railcar system 100 passed the test. Another test was performed with a 1,250,000 psi impact, and the system 100 passed that test also.

The embodiments herein first contemplate a 60 foot length as an example, but if a customer had sufficient funds and requested a 72 foot or 90 foot railcar, the railcar system 100 can accommodate this. In the event this occurs, need to get FRA approval (Federal Railway Association) which includes having the frame 400 retested.

Figure 6:
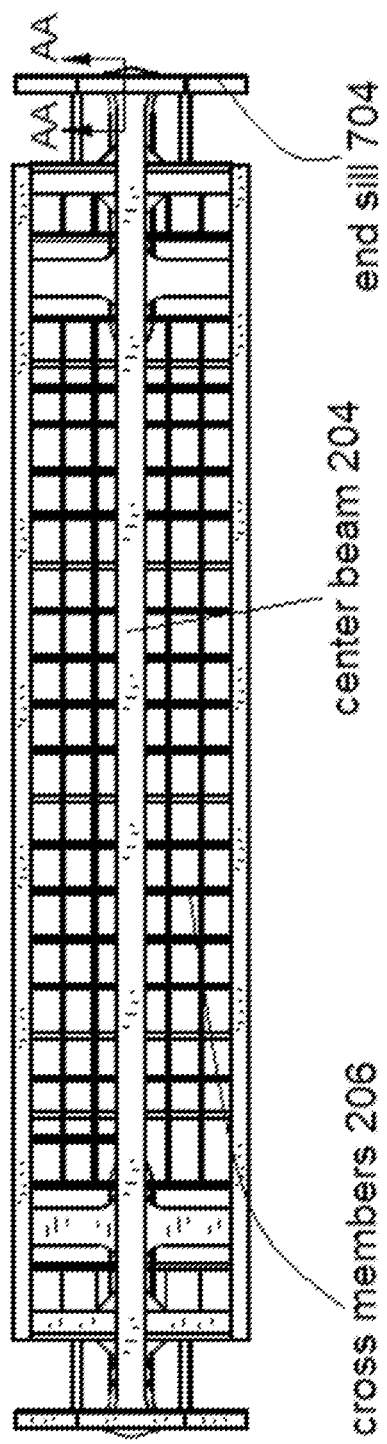
FIG. 6 shows a side view of the crash posts.
Figure 7:
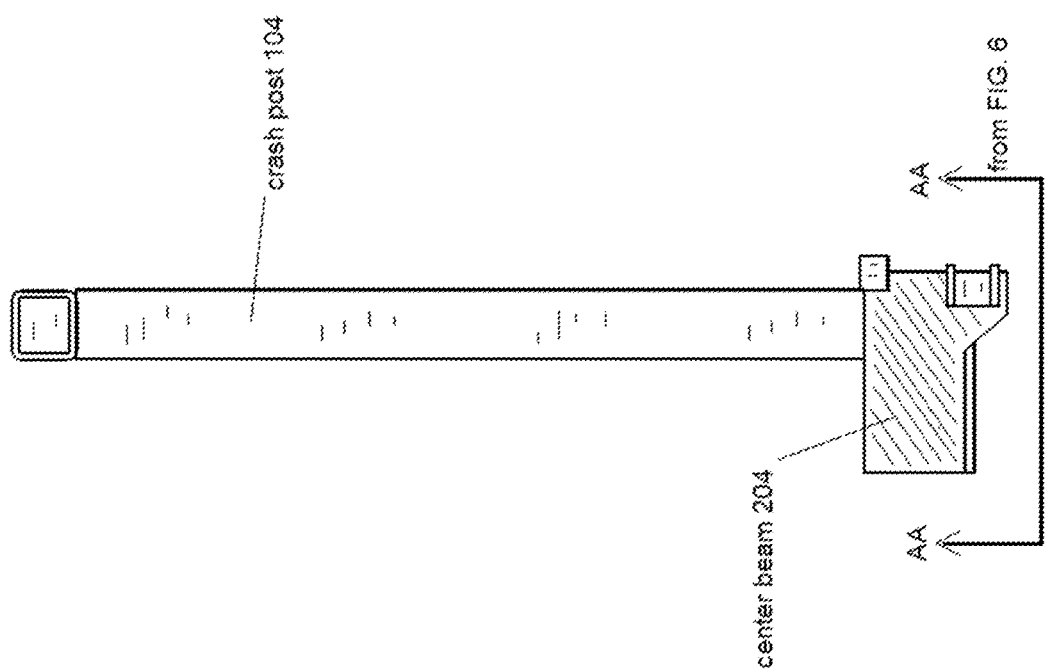
FIG. 7 shows an underside view of a railcar system, including a cut-away view of the cut-line AA-AA of FIG. 6.
Figure 8A:
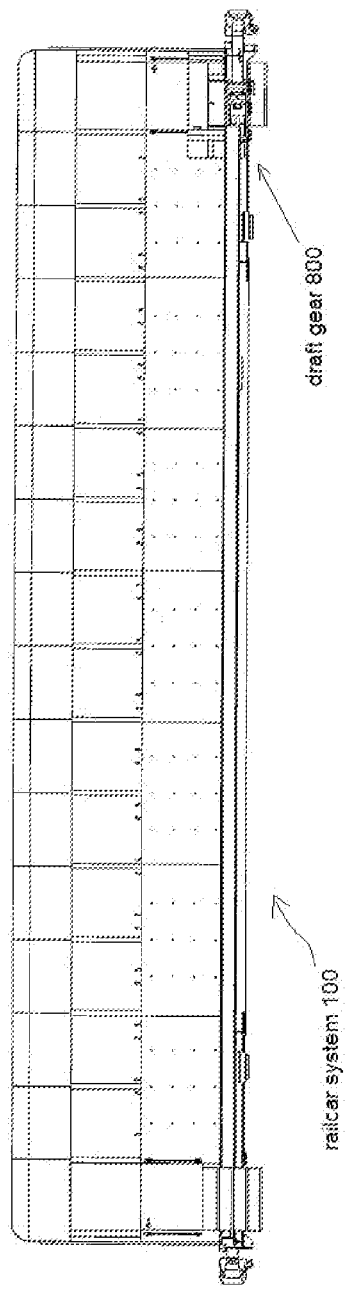
Figure 8B:
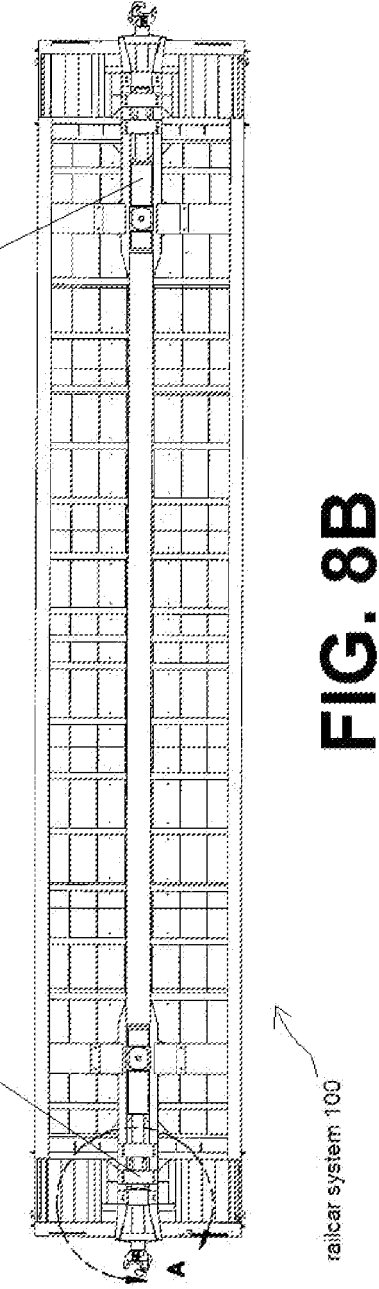
Figure 8C:
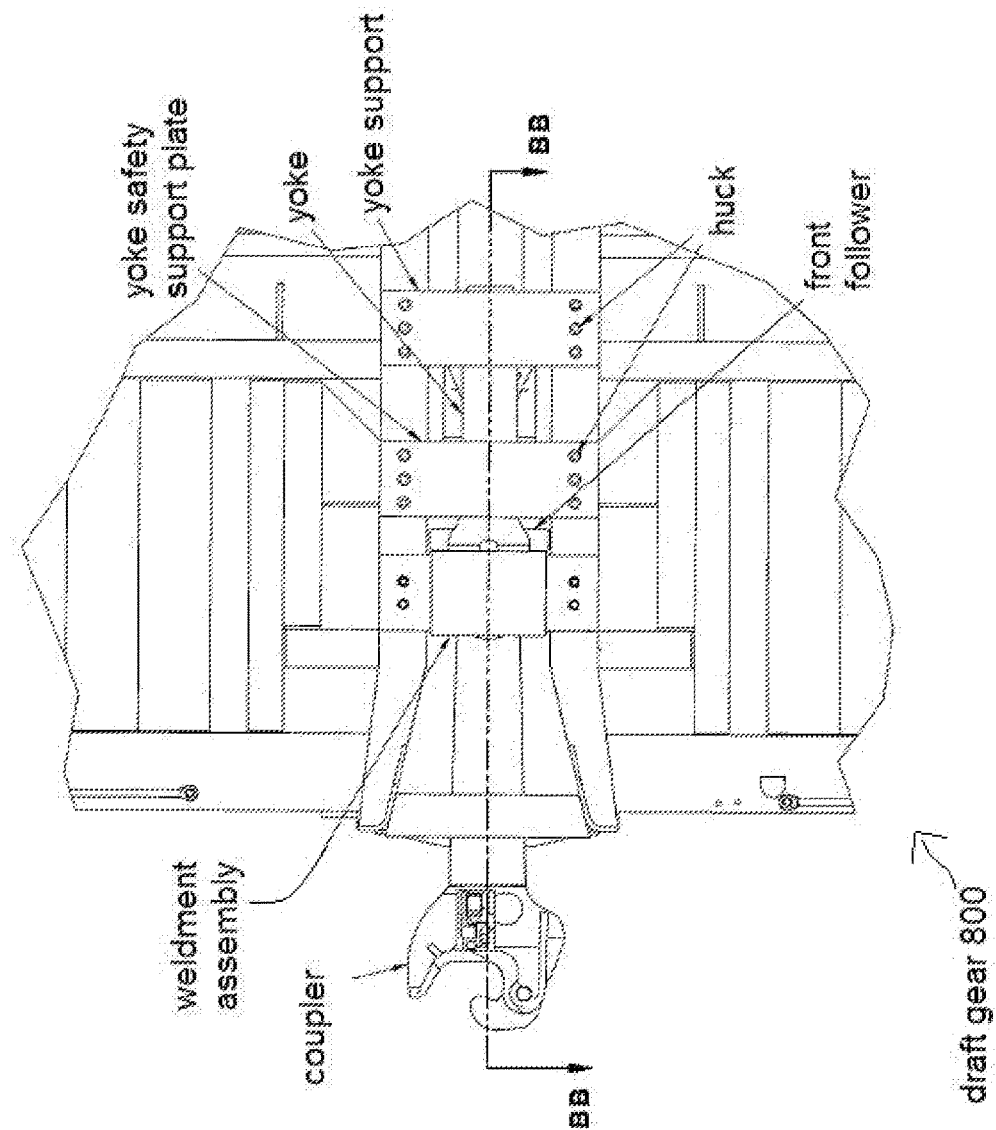
Figure 8D:
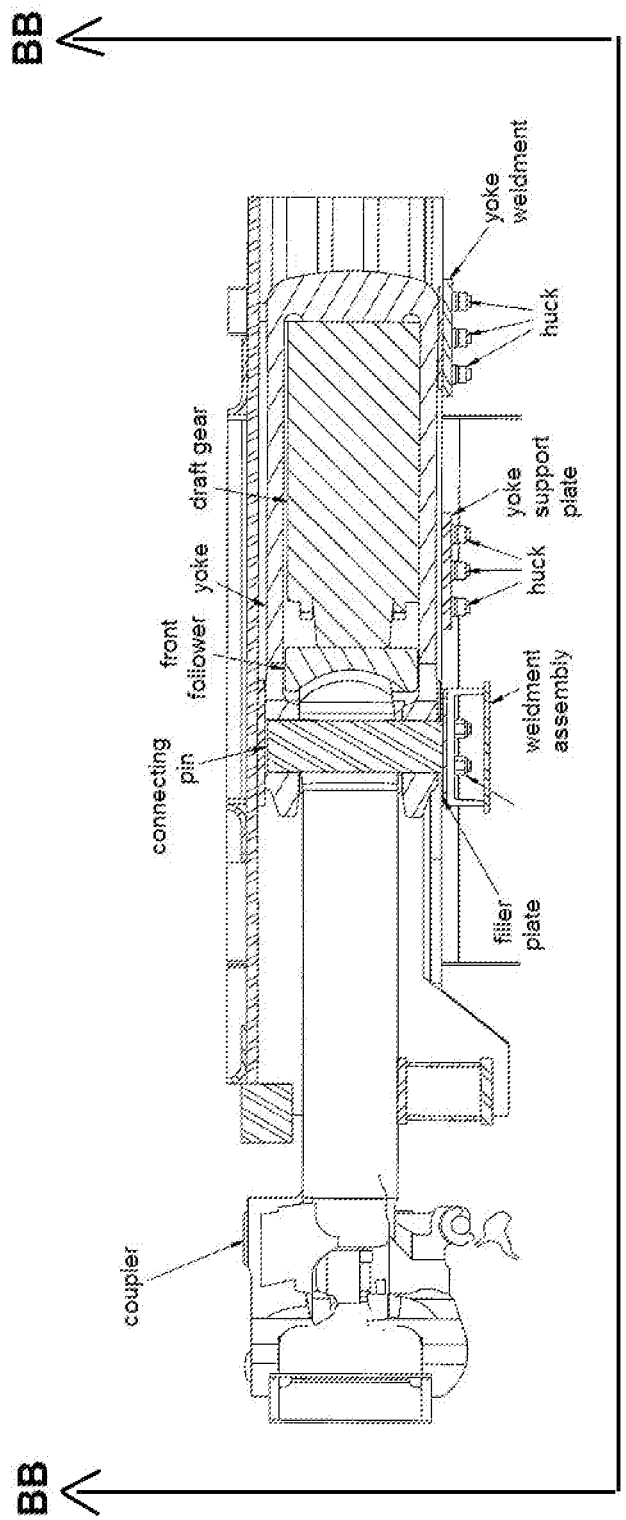

FIGS. 6-7 depicts views of the crash post 104, the frame 400, as well as end sills 704. FIG. 7 shows a cut-away view of the cut-line AA-AA shown in FIG. 6. When assembled the crash posts 104 bring the safety requirements of the railcar system 100 up to the necessary FRA codes for passenger usage.

FIGS. 8A, 8B, 8C, and 8D show an example arrangement of a draft gear 800. A draft gear 800 is located on each end of the railcar system 100 and allows the main central beam 204 through the cushion area to interact with other railcars, thereby becoming a fully functioning railcar system 100 in both safety and mechanical aspects. The draft gear 800 is a spring-loaded mechanism that allows the various railcars to be hooked together, but to minimize hard bumping therebetween.

Buffer Plates and Diaphrams

FIGS. 9A and 9B show the buffer (gang) plates 916, which comprise a series of plates which allow human movement between two railcars while stationary or in movement. The buffer (gang) plates 916 extend from each railcar system 100 to provide a safe and stable walkway between two such railcars, and are held in positions by the springs 920. This is a design feature which is not often available in scenic passenger railcars. The buffer (gang) plate opening 904 is located where the door exits out of one car and there is a space entering into another one.

FIGS. 9A and 9B also show a side diaphragm 908 and a top diaphragm 912 on the end of passenger railcars. The side diaphragm 908 and top diaphragm 912 form a barrier so that there is an opening between two cars allowing a person to walk between two cars, while still being completely enclosed. This is a feature of most passenger cars but not freight cars and often not a feature of (conventional, Prior Art) scenic passenger cars due to the fact that these conventional Prior Art scenic passenger cars are merely modified freight cars which did not have diaphragms originally.

As shown in FIGS. 9A and 9B, the side diaphragm 908 is located on each side of the door, the top diaphragm 912 is located on the top portion of the door, terminating at walking level on the buffer plates 916 as previously described. FIG. 9B is a view of side diaphragm 908 and top diaphragm 912. When two railcar systems 100 come together, the diaphragms 908/912 act as a cushion section that come together thereby closing the opening of two cars, either while stationary or in movement. There are also diaphragm boots attached to the crash posts 104.

This completes the section on buffer (gang) plates and diaphragms.

The embodiments herein use ASM-certified (American Society of Metals) steel. That's a high grade of durable, safe, but expensive steel. That certification grade factors in, among other things, how much carbon, and how much other elements are included, to make that grade of steel. This steel was found suitable for the embodiments herein because it's heavier, more durable, lasts longer and welds better. That is, such grades of steel also take to welding a lot better than a cheaper steel. These higher grades of steel are also more expensive, but the improvements in the end-product are noticeable, including numerous passenger safety aspects. Accordingly, using the better steel greatly improves the quality of the resulting railcar system 100.

Alternative Embodiments and Sizes

Some scenic passenger railroads use what is called narrow gauge rail, one example of which measures exactly 3 feet in width. It is possible to use the railcar system 100 according to the principles described herein, but do the manufacturing using different sized frames, width, and height, so as to accommodate varying gauges of rail.

In 2019 and beyond, in the freight industry there is a growing tendency to avoid airports. Some private companies like in Houston, Tex. take care of the inner city passenger movement using trains. One reason to choose a specific 60 foot length for the railcar system 100 is most urban trolleys are 40 and 60 feet long, using examples of St Louis (Mo.) or St Paul (Minn.).

In an embodiment, the system 100 measures 60 feet in length. Many passenger cars were made too long to operable in certain environments, e.g. 90 feet long in some cases. Earlier passenger cars started out about 40 feet long, and then went to 50 and 60 feet, and now they're up to 85 feet and they can't get past certain turns and grades. Thus, 85 feet railcars are a problem.

The railcar system 100 described herein is a scenic passenger railcar with all the necessary coupling, pneumatic, hydraulic necessary for transportation and delivery. The railcar system 100 has all the features required of a passenger railcar. Further, the frame 400 of the system 100 is designed with mechanical and safety requirements for a passenger railcar, thereby allowing the scenic passenger car to be delivered and transported across any typical modern railway.

Additional Features

A non-limiting list of potential features of the embodiments herein comprises being made from U.S. steel, including a steel non-slip floor for ease of cleaning with garden hose or pressure washer, where that floor may be slightly elevated floor in center for water drainage.

It is also contemplated to add a series of solar features to the railcar system 100 that allow it to have some basic charging functions as well as other solar features. For example, during times the railcar system 100 is stationary and in the sun, solar panels can be heating water or charging an emergency battery, or taking load off the existing electrical system. An electrical arrangement (not shown) located within the frame 400 can be set up for either 480 Volt (3 phase), or 240 Volt (single phase).

Method of Manufacture

The center beam 204 and all other materials are ordered from steel supplier. Material is cut to length by the steel supplier. The steel package arrives, and construction begins. Working off of blueprints, the various parts are assembled and welded together. In one non-limiting embodiment, the various components are wire-welded together with flux core wire that is Grade ER 70. Additionally, all steel used within the frame 400 is Grade 50 and Grade 36 Structural Steel, which is always entirely made in the USA. As such, the embodiments herein do not need or require any foreign steel.

What follows is a partial, non-limiting list of some example steps used in assembling the railcar system 400, as partially outlined in FIG. 10:

assemble and position the center beam 204;
attach the side sills 208 and end sills 704 onto the center beam 204, thereby forming the beginnings of a frame 400;
install the body bolsters 244 onto the frame 400;
welding the crash posts 104 onto the frame 400;
fastening the floor cross members 206 onto the frame 400;
installing the buffer plate/spring assembly 916/920 onto the frame 400;
installing the steel decking 422 onto the frame 400, mainly at the floor cross members 206;
installing the exterior wall supports 412 onto the frame 400;

installing roof trusses 424 onto the exterior wall supports 412;

fastening the frame 400 onto the trucks 108;

fastening stainless steel roof panels (not shown) onto the frame 400; and bolting the diaphragm boots 344 onto the crash posts 104.

The above is merely a suggested, non-limiting, possible order or sequence of operations. For example, the diaphragm boots 344 can be welded to the crash posts 104 at various different stages in assembly, and does not need to be done last. However, after some experimentation and process experience, it has been found convenient to perform the step of bolting diaphragm boots 344 at the end.

Regarding the step of installing the steel decking 422 onto the frame 400; and then install the exterior wall supports 412 onto the frame 400; these steps could be reversed. Further, if conditions in the assembly area are more favorable, the step of installing the steel decking 422 onto the frame 400 after the step of installing roof trusses 424 onto the exterior wall supports 412, and even potentially after the step of fastening the frame 400 onto the trucks 108.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

21. The method of claim 1, further comprising:
the side and top diaphragms acting as a covering section that come together thereby enclosing a space between two railcar systems.

22. The method of claim 1, further comprising:
locating a draft gear assembly on each end of the railcar system for allowing the center beam through a cushion area between railcar systems.

23. The method of claim 21, further comprising:
configuring the draft gear as a spring-loaded mechanism facilitating a plurality of railcar systems to be connected together while minimize hard bumping therebetween while in motion.

24. The method of claim 1, further comprising:
configuring the railcar system to measure 60 feet in length.

25. The method of claim 1, further comprising:
configuring the railcar system to measure 72 feet in length.
the center strut comprising a rectangular member and a trapezoidal member.
configuring the draft pocket to have an adaptable hitch system suitable for connecting to a trolley arrangement.

X. The method of claim 1, further comprising:
incorporating solar features connected to a charging capability into the railcar system;
the solar panels heating water, or charging an emergency battery, or taking load off an existing electrical system.

X. The method of claim 1, further comprising:
configuring the system for 480 Volt three-phase power.

X. The method of claim 1, further comprising:
configuring the system for 240 Volt single-phase power.

X. The method of claim 1, further comprising:
welding the center strut to each side sill using a side weld;

X. The method of claim 1, further comprising:
welding the frame strut to each side sill using a top weld;

26. The method of claim 1, further comprising:
incorporating a steel non-slip floor for ease of cleaning with garden hose or pressure washer.

27. The method of claim 26, further comprising:
during construction (not use) of the railcar system, locating a center portion of a steel non-slip floor above the edge (non-center) portions, thereby achieving a crown effect suitable for water drainage.

What is claimed is:

1. A method of manufacturing and configuring a railcar system, comprising:
configuring a rectangular center beam to have a square cross-section;
positioning two frame beams in parallel to and at either side of the center beam;
connecting the center beam to the two frame beams using a plurality of cross members;
locating end sills at each end of the center beam thereby forming a frame;
locating a plurality of frame struts above the center beam and making a plurality of connections between the frame struts and the frame beams;
welding the frame struts to the center beam;
attaching two crash posts at each end of the frame using welds sufficiently strong to withstand a rollover; and
reinforcing each crash post with a diaphragm boot.

2. The method of claim 1, further comprising:
forming the frame to be rectangular in shape.

3. The method of claim 1, further comprising:
the plurality of frame struts supporting a floor of a passenger compartment within the frame.

4. The method of claim 1, further comprising:
incorporating a crumple zone within the frame for, during an impact situation, facilitating crumpling and distorting of the frame but preventing breakage of the frame; and
the crumple zone acting as a shear point for the frame.

5. The method of claim 1, further comprising:
attaching a set of trucks at each end of the frame.

6. The method of claim 1, further comprising:
attaching a curved surface at a an end of the frame;
forming the curved surface as a draft pocket.

7. The method of claim 1, further comprising:
incorporating connectors onto each end of the frame, the connectors being suitable for picking up the railcar body with a crane; and
during use, connecting multiple railcars together by attaching safety chains to the connectors.

8. The method of claim 1, further comprising:
the steps of connecting and locating being performed by welding using welding wire having a tensile strength of 70,000 PSI.

9. The method of claim 1, further comprising:

prior to being welded, grinding and making a V-shaped cut in a first surface of two pieces to be welded;

prior to being welded, grinding and making a V-shaped protrusion in a second surface of the two pieces to be welded;

welding the first and second pieces such that when they go together, there exists a matching V shape between the V-shaped cut and the V-shaped protrusions.

10. The method of claim 9, further comprising:

welding various connections within the frame using the matching V shape between two surfaces to be welded; and ensuring that a welding wire enters into the matching V shape such that the resulting welded joint becomes stronger than the individual materials being connected.

11. The method of claim 1, further comprising:

subjecting the railcar system to a variety of compression and tensile tests; and the railcar system withstanding an impact load of 1,250,000 lbf (pound-force), and a compressive end load of 1,000,000 lbf (pound-force).

12. The method of claim 1, further comprising:

attaching a plurality of buffer (gang) plates at each end of the frame, the buffer (gang) plates comprising a series of plates which allow human movement between two railcar systems.

13. The method of claim 12, further comprising:

mounting the buffer (gang) plates to be held in position by springs.

14. The method of claim 1, further comprising:

locating a side diaphragm and a top diaphragm on each end of the railcar system.

15. The method of claim 14, further comprising:

locating the side diaphragm on each side of a door at an end of the railcar system.

16. The method of claim 14, further comprising:

locating the top diaphragm on the top portion of the door but terminating at a foot-level height of a passenger above the buffer plates.

* * * * *